(12) United States Patent
Itoyama et al.

(10) Patent No.: US 6,640,775 B2
(45) Date of Patent: Nov. 4, 2003

(54) AIR-FUEL RATIO CONTROL SYSTEM FOR INTERNAL COMBUSTION ENGINE

(75) Inventors: Hiroyuki Itoyama, Yokohama (JP);
Hiroshi Iwano, Kanagawa (JP);
Kensuke Osamura, Kanagawa (JP);
Kenji Oota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 87 days.

(21) Appl. No.: 10/042,212

(22) Filed: Jan. 11, 2002

(65) Prior Publication Data

US 2002/0100454 A1 Aug. 1, 2002

(30) Foreign Application Priority Data

Feb. 1, 2001 (JP) .......................................... 2001-026035

(51) Int. Cl.[7] .............................................. F02D 41/00
(52) U.S. Cl. ....................................... 123/305; 123/681
(58) Field of Search ................................ 123/305, 295, 123/681, 568.12, 568.21, 568.26, 677, 679, 486

(56) References Cited

U.S. PATENT DOCUMENTS 5,797,370 A * 8/1998 Kimura et al. ............... 123/478
5,934,249 A * 8/1999 Nanba et al. ................. 123/350
6,079,387 A * 6/2000 Mamiya et al. .............. 123/295
6,085,717 A * 7/2000 Kamura et al. .............. 123/295

FOREIGN PATENT DOCUMENTS

| EP | 0 829 630 A2 | 3/1998 |
| EP | 0 964 142 A2 | 12/1999 |
| JP | 10-288043 | 10/1998 |

OTHER PUBLICATIONS

Patent Abstracts of Japan, vol. 2000, No. 03, Mar. 30, 2000 and JP 11–351068, Dec. 21, 1999.
Patent Abstracts of Japan, vol. 017, No. 294 (M–1424), Jun. 7, 1993 and JP 05–018323, Jan. 26, 1993.

* cited by examiner

*Primary Examiner*—Mahmoud Gimie
(74) *Attorney, Agent, or Firm*—Foley & Lardner

(57) ABSTRACT

An air-fuel ratio control system for an internal combustion engine is comprised of an engine condition detecting unit and a control unit. The control unit is arranged to calculate a target engine torque on the basis of an engine operating condition, to calculate a target EGR ratio, a target excess air ratio and a target intake air quantity on the basis of the engine operating condition and the target engine torque, to calculate a target equivalence ratio on the basis of the target EGR ratio and the target excess air ratio, to calculate a target injection quantity on the basis of the engine operating condition and the target equivalence ratio, and to control an air-fuel ratio by bringing a real intake air quantity to the target intake air quantity and by bringing a real fuel injection quantity to the target fuel injection quantity.

13 Claims, 22 Drawing Sheets

APO - OPEN AREA : Aapo CONVERSION TABLE

Adnv - Qh0 CONVERSION TABLE

TARGET TORQUE MAP

BASIC TARGET EGR RATIO MAP

TARGET EGR RATIO CORRECTION TABLE

BASIC TARGET EXCESS AIR RATIO MAP

WATER TEMP. CORRECTION TABLE

BASIC TARGET INTAKE AIR QUANTITY MAP

EXCESS AIR RATIO TORQUE CORRECTION MAP

VOLTAGE - AIR QUANTITY CONVERSION TABLE

Kinb MAP tNOx MAP

TARGET EGR RATIO - ATMOSPHERIC
PRESSURE CORRECTION TABLE

TARGET EXCESS AIR RATIO - ATMOSPHERIC PRESSURE CORRECTION TABLE

AIR-FUEL RATIO CONTROL SYSTEM FOR INTERNAL COMBUSTION ENGINE

BACKGROUND OF THE INVENTION

The present invention relates to an air-fuel ratio control system for an internal combustion engine, and more particularly to an air-fuel ratio control which is capable of improving an engine performance in a transient operation during EGR (exhaust gas recirculation) control.

JP-A-10-288043 discloses an air-fuel ratio control system for an internal combustion engine. This air-fuel ratio control system is arranged to determine a preferable relationship between an excess air ratio and an EGR ratio in correspondence to each engine operating condition and to control the engine on the basis of this determined relationship in order to mainly ensure exhaust gas purifying performance.

SUMMARY OF THE INVENTION

However, this air-fuel ratio control system has limitations in varying the excess air ratio and the EGR ratio since the air-fuel ratio control is executed on the basis of this linear relationship.

It is therefore an object of the present invention to provide an improved air-fuel ratio control system which is capable of maintaining an optimum combustion condition of an internal combustion engine even when an excess air ratio and an EGR ratio of the engine are separately varied, such as during a transient operation.

An aspect of the present invention resides in an air-fuel ratio control system which is for an internal combustion engine and which comprises an engine condition detecting unit and a control unit coupled to the engine condition detecting unit. The engine condition detecting unit detects an engine operating condition of the internal combustion engine. The control unit is arranged to calculate a target engine torque on the basis of the engine operating condition; to calculate a target EGR ratio, a target excess air ratio and a target intake air quantity on the basis of the engine operating condition and the target engine torque; to calculate a target equivalence ratio on the basis of the target EGR ratio and the target excess air ratio; to calculate a target injection quantity on the basis of the engine operating condition and the target equivalence ratio; and to control an air-fuel ratio at a desired value by bringing a real intake air quantity to the target intake air quantity and by bringing a real fuel injection quantity to the target fuel injection quantity.

Another aspect of the present invention resides in a method for controlling an air-fuel ratio of an internal combustion engine. The method comprises a step for detecting an engine operating condition of the internal combustion engine; a step for calculating a target engine torque on the basis of the engine operating condition; a step for calculating a target EGR ratio, a target excess air ratio and a target intake air quantity on the basis of the engine operating condition and the target engine torque; a step for calculating a target equivalence ratio on the basis of the target EGR ratio and the target excess air ratio; a step for calculating a target injection quantity on the basis of the engine operating condition and the target equivalence ratio; and a step for controlling an air-fuel ratio at a desired value by bringing a real intake air quantity to the target intake air quantity and by bringing a real fuel injection quantity to the target fuel injection quantity.

DETAILED DESCRIPTION OF THE INVENTION

Referring to FIGS. 1 to 24, there is shown a first embodiment of an air-fuel ratio control system for an internal combustion engine 8 according to the present invention.

Figure 1:
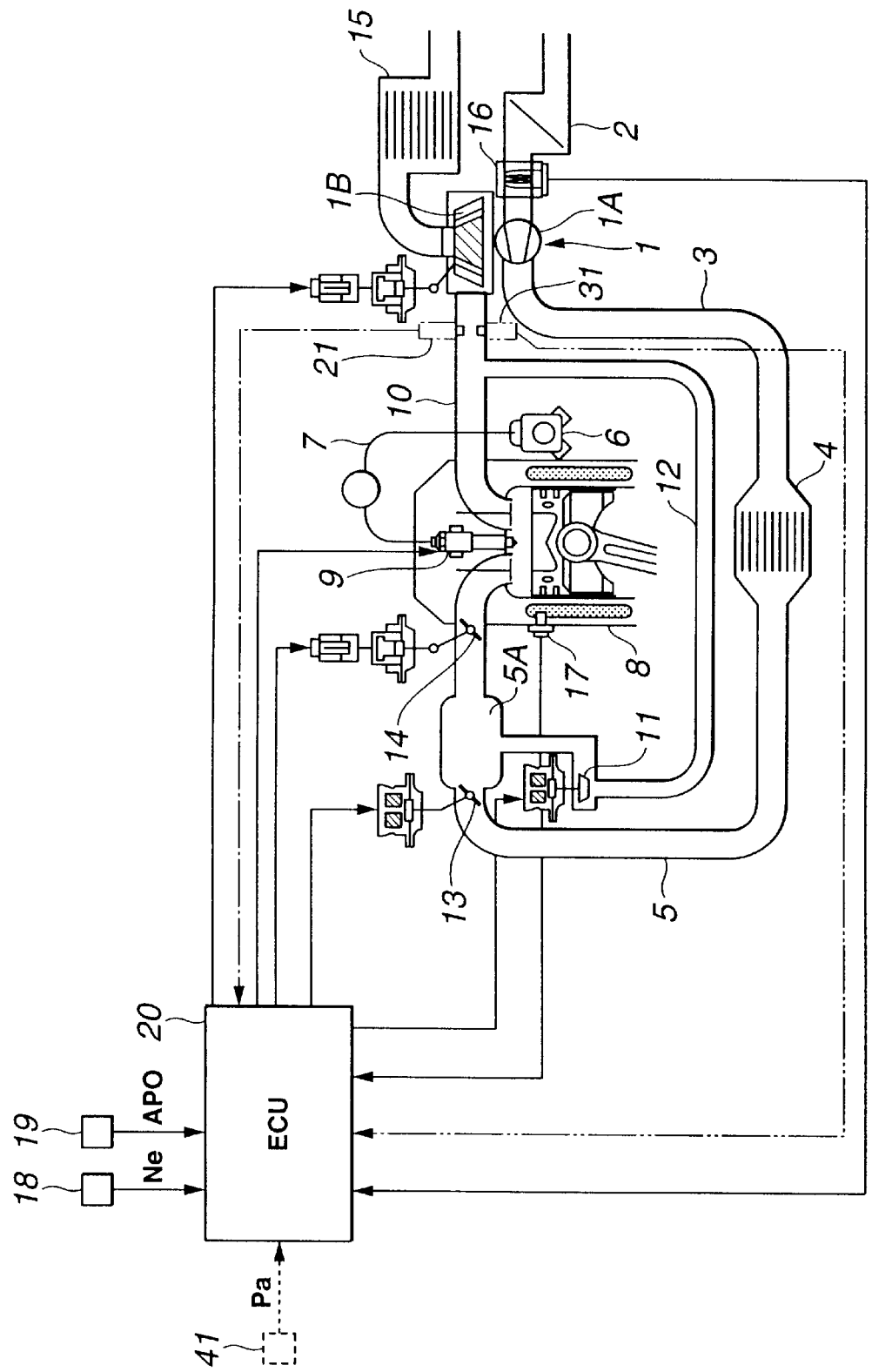
FIG. 1 is a schematic view showing an air-fuel ratio control system of a first embodiment according to the present invention.

As shown in FIG. 1, an air cleaner 2 is disposed upstream of an airflow meter 16 and filters air for internal combustion engine 8 to eliminate dust. The filtered air is supplied to an intake passage 3. Thereafter, the filtered air is compressed by an intake air compressor 1A of a turbocharger 1 and is cooled by an intercooler 4. Then, the compressed and cooled air is fed to an intake manifold 5.

On the other hand, fuel is fed from a supply pump 6 to a common rail 7 and stored in common rail 7 at high pressure. The pressurized fuel is injected from each injector 9 to a combustion chamber of each cylinder of engine 8 and is then ignited (or fired) and combusted in each combustion chamber.

A collector 5A of intake manifold 5 is connected with an exhaust manifold 10 through an EGR (exhaust gas recirculation) passage 12, and an EGR valve 11 is provided in EGR passage 12. An electronically controlled throttle valve 13 is provided just upstream of collector 5A. An EGR (exhaust gas recirculation) control is mainly executed when engine 8 runs under an idling condition or a low-load condition, in order to improve the exhaust emission and to reduce the noise generation. The EGR control is accomplished by choking throttle valve 13 and simultaneously controlling the opening of EGR valve 11. A swirl control valve 14 is provided in each intake port which is branched from collector 5A of intake manifold to each cylinder of engine 8. Swirls in each cylinder are generated by controlling the opening degree of swirl control valve 14 according to the engine operating condition.

Exhaust gas is discharged from each combustion chamber of each cylinder to exhaust manifold 10 and rotates an exhaust turbine 1B of turbocharger 1. Thereafter, $NO_x$ (nitrogen oxide) of the exhaust gas is trapped by a $NO_x$ trap catalyst 15 provided downstream of exhaust turbine 1B in the exhaust passage, and is then released in atmosphere. Exhaust turbine 1B of turbocharger 1 is of a variable nozzle type which is arranged to variably control a pressure charging.

Various sensors for detecting the operating condition of engine 8 are installed to engine 8 and peripheral devices thereof. More specifically, an airflow meter 16 for detecting an intake airflow rate is disposed in inlet passage 3 downstream of air cleaner 2. A water temperature sensor 17 for detecting an engine coolant temperature is installed to an engine block of engine 8. An engine speed sensor 18 for detecting an engine speed is installed to an output shaft of engine 8. An accelerator opening sensor 19 is installed to an accelerator pedal provided in a passenger compartment of a vehicle equipped with engine 8.

An electronic control unit (ECU) 20 is coupled to these sensors 16, 17, 18 and 19 and receives engine operating condition indicative signals therefrom. Further, ECU 20 is coupled to each injector 9, EGR valve 11, throttle valve 13, and swirl control valve 14. ECU 20 executes the EGR control, an air-fuel ratio control (fuel injection control) and the swirl control according to the engine operating condition determined on the basis of the detected signals. Particularly, ECU 20 executes a characteristic air-fuel ratio control so that an optimum combustion in each combustion chamber of engine 8 is always ensured even when $NO_x$ trap catalyst 15 is being regenerated or when a target excess air ratio is varied stepwise while the EGR ratio is kept constant.

Hereinafter, the air-fuel ratio control executed by ECU 20 will be discussed. Each of flowcharts discussed later is executed at 10 msec intervals or by each rotational equivalent period REF. Further, the calculation result obtained by the execution of each flowchart is stored in ECU 20 and is updated.

A torque demand control will be discussed first. A calculation process of a target engine torque will be discussed with reference to FIG. 2.

At step S1, ECU 20 reads an engine speed Ne outputted from engine speed sensor 18 and an accelerator opening APO outputted from accelerator opening sensor 19.

Figure 3:
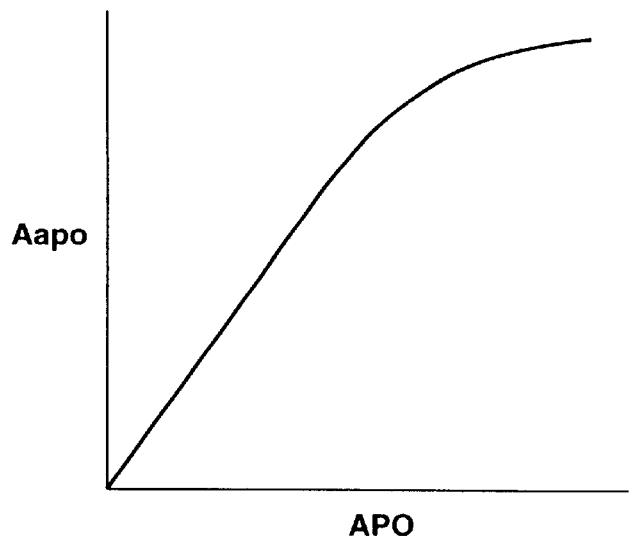
FIG. 3 is a table showing a relationship between an acceleration opening and an opening area.

At step S2, ECU 20 calculates an acceleration opening area Aapo by linear interpolation from accelerator opening APO and a table of FIG. 3 which shows a relationship between accelerator opening APO and accelerator opening area Aapo and which are previously stored in ECU 20.

At step S3, ECU 20 calculates a unit-rotation intake air quantity (preliminary intake air quantity ratio) Adnv representative of an intake air quantity per a unit rotation of engine 8 from the following equation (1).

$$Adnv = Aapo/Ne/VOL\# \quad (1)$$

where VOL# is an exhaust gas quantity.

Figure 4:
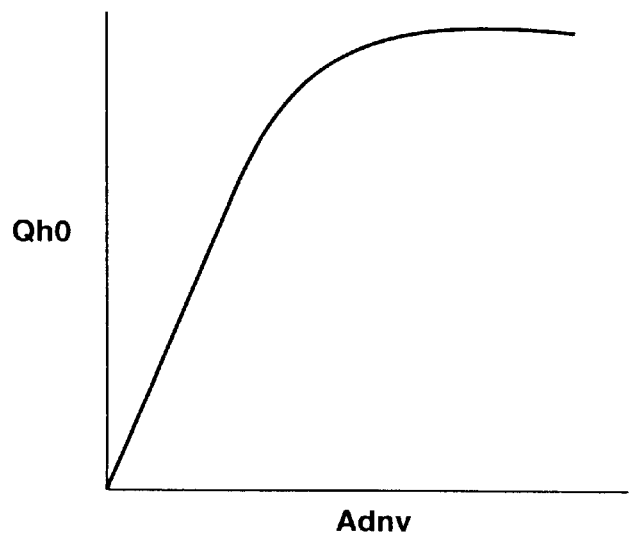
FIG. 4 is a table showing a relationship between a unit-rotation intake air ratio and a load rate.

At step S4, ECU 20 calculates a load ratio corresponding value Qh0 by linear interpolation from a table of FIG. 4 and unit-rotation intake air quantity Adnv. The table of FIG. 4 shows a relationship between unit-rotation intake air quantity Adnv and load ratio corresponding value Qh0, and has been previously stored in a storage section of ECU 20.

Figure 5:
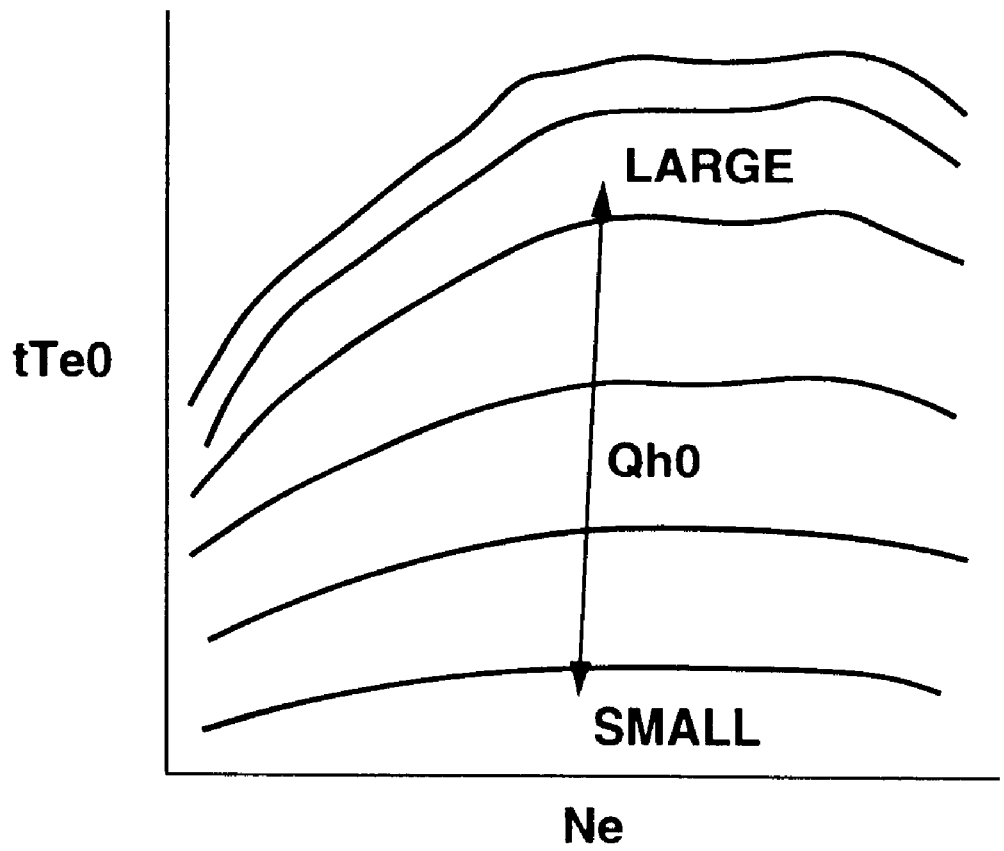
FIG. 5 is a map showing a relationship among a target engine torque, an engine speed and the load rate.

At step S5, ECU 20 calculates a target engine torque tTe by interpolation from a map of FIG. 5, engine rotation speed NE and load rate corresponding value Qh0. The map of FIG. 5 shows a relationship among target engine torque tTe, engine speed Ne and load rate corresponding value Qh0, and has been previously stored in the storage section of ECU 20. After the execution of step S5, the calculation process of the target engine torque is terminated.

Next, a calculation process of a target EGR ratio tEGR will be discussed with reference to a flowchart of FIG. 6.

At step S11, ECU 20 reads engine speed Ne, target engine torque tTe and an engine water temperature Tw outputted from engine water temperature sensor 17.

Figure 7:
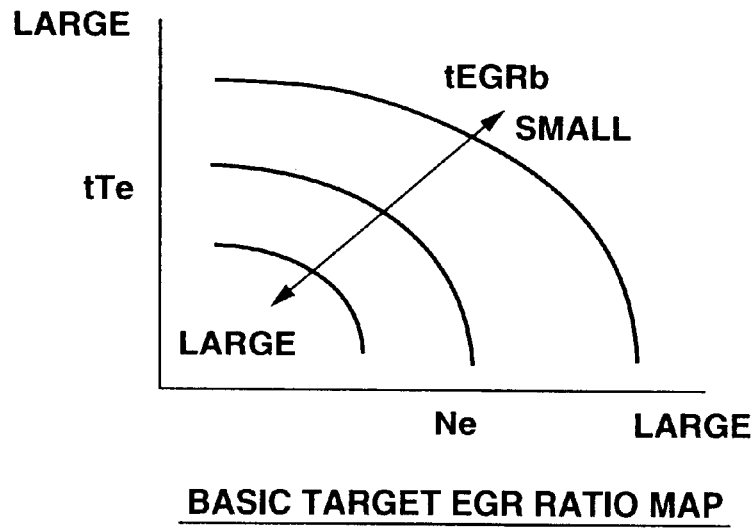
FIG. 7 is a map showing a relationship among a basic target EGR ratio, the engine speed and the target engine torque.

At step S12, ECU 20 calculates a basic target EGR ratio tEGRb by retrieving a map shown in FIG. 7 on the basis of engine speed Ne and target engine torque tTe. The map of FIG. 7 shows a relationship among basic target EGR ratio tEGRb, engine speed Ne and target engine torque tTe, and is previously stored in ECU 20.

Figure 8:
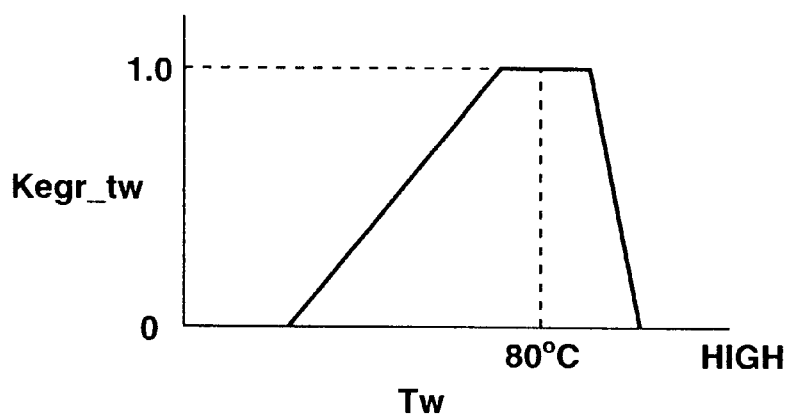
FIG. 8 is a table showing a relationship between a target EGR ratio correction coefficient and an engine water temperature.

At step S13, ECU 20 calculates a target EGR-ratio temperature correction-coefficient Kegr_tw by retrieving a table shown in FIG. 8 on the basis of engine water temperature Tw. The table of FIG. 8 shows a relationship between target EGR-ratio temperature correction-coefficient Kegr_tw and engine water temperature Tw, and has been previously stored in the storage section of ECU 20

At step S14, ECU 20 calculates a target EGR ratio tEGR by multiplying basic target EGR ratio tEGRb and target EGR-ratio temperature correction-coefficient Kegr_tw. Thereafter, the present routine is terminated.

Next, a calculation process of a target excess air ratio will be discussed with reference to a flowchart of FIG. 9. This calculation process for calculating target excess air ratio tLAMBDA is a main control according to the present invention.

At step S21, ECU 20 reads engine speed Ne, target engine torque tTe obtained in the target engine torque calculation process, and engine water temperature Tw.

Figure 10:
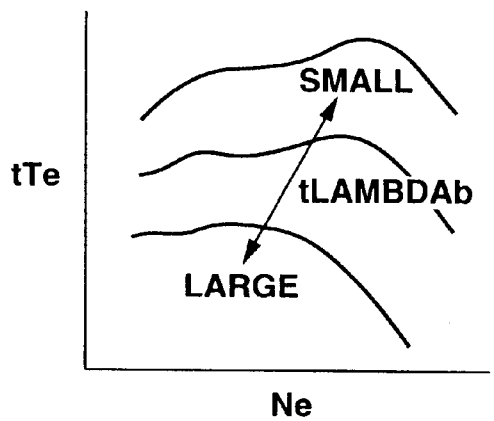
FIG. 10 is a map showing a relationship among a basic target excess air ratio, the engine speed and the target engine torque.

At step S22, ECU 20 calculates a basic target excess air ratio tLAMBDAb with reference to a map of FIG. 10 on the basis of engine speed Ne, target engine torque tTe. The map of FIG. 10 shows a relationship among basic target excess air ratio tLAMBDAb, engine speed Ne and target engine torque tTe, and is previously stored in ECU 20. As is clear from FIG. 10, the map of FIG. 10 is set so that the excess air ratio decreases (A/F becomes rich) as engine speed Ne increases, and that the excess air ratio decreases as target engine torque tTe increases.

Figure 11:
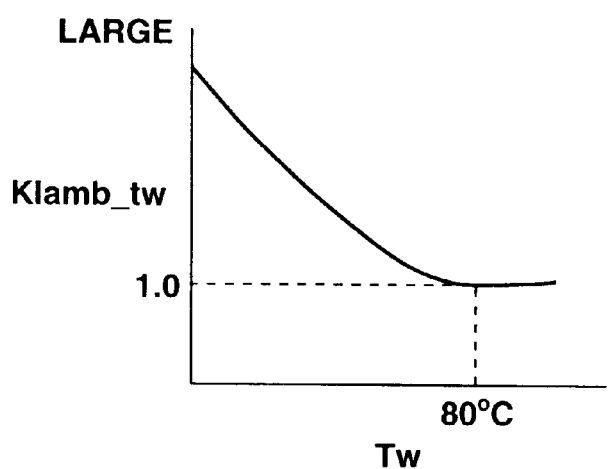
FIG. 11 is a table showing a relationship between a relationship between a water temperature correction coefficient for the basic target excess air ratio and the engine water temperature.

At step S23, ECU 20 calculates a water-temperature correction-coefficient Klmab_tw with reference to a table of FIG. 11 on the basis of engine water temperature Tw. The table of FIG. 11 shows a relationship between water-temperature correction-coefficient Klmab_tw and engine water temperature Tw, and has been previously stored in the storage section of ECU 20. As is clear from FIG. 11, the table of FIG. 11 is set so that the excess air ratio is increased when engine water temperature Tw decreases, in order to adapt the excess air ratio to the increase of friction of engine 8 or unstability of the engine operating condition due to lowering of engine water temperature Tw.

At step S24, ECU 20 calculates target excess air ratio tLAMBDA by correcting basic target excess air ratio tLAMBDAb in a manner of multiplying basic target excess air ratio tLAMBDAb by water-temperature correction-coefficient Klmab_tw, as represented by the following equation (2).

$$tLAMBDA = tLAMBDAb \times Klamb\_tw \quad (2)$$

Hereinafter, there will be discussed several flowcharts relating to the calculation of a target fuel injection quantity by which a desired target air-fuel ratio quantity tLAMBDA is calculated.

A calculation process of a target equivalence ratio tFBYA will be discussed with reference to FIG. 12.

At step S41, ECU 20 reads target excess air ratio tLAMBDA and a real EGR ratio rEGR determined on the basis of the opening of EGR valve 13 and the engine operating condition. A detailed calculation process of real EGR ratio rEGR will be discussed later with reference to a flowchart of FIG. 22.

At step S42, ECU 20 calculates target equivalence ratio tFBYA from the following equation (4) based on the equation (3).

Excess Air Ratio={(Intake Air Quanitity)×[1+(EGR Ratio)×(Oxygen Ratio in EGR Gas)]}/(Fuel Injection Quantity×14.6) (3)

$$tFBYA = [tLAMBDA + rEGR \times (tLAMBDA - 1)]/(tLAMBDA)^2 \quad (4)$$

Figure 12:
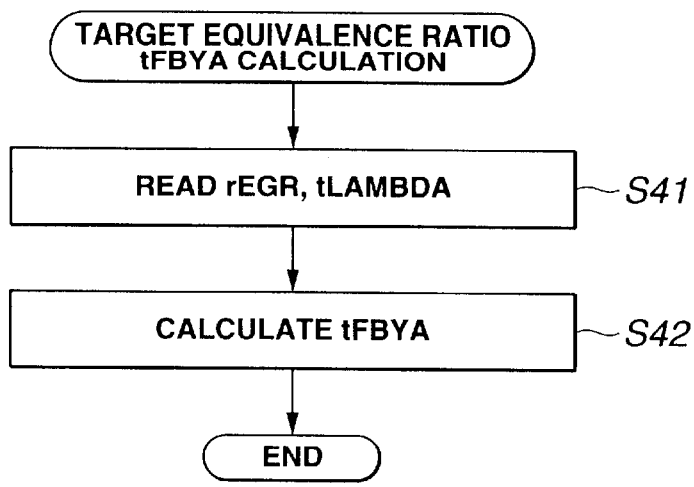
FIG. 12 is a flowchart showing a routine for calculating a target equivalence ratio.

Thereafter, the present routine of the flowchart of FIG. 12 is terminated.

A calculation process of a target intake air quantity tQac will be discussed with reference to FIG. 13.

At step S51, ECU 20 reads engine speed Ne, target engine torque tTe, target EGR ratio tEGR and target excess air ratio tLAMBDA.

Figure 14:
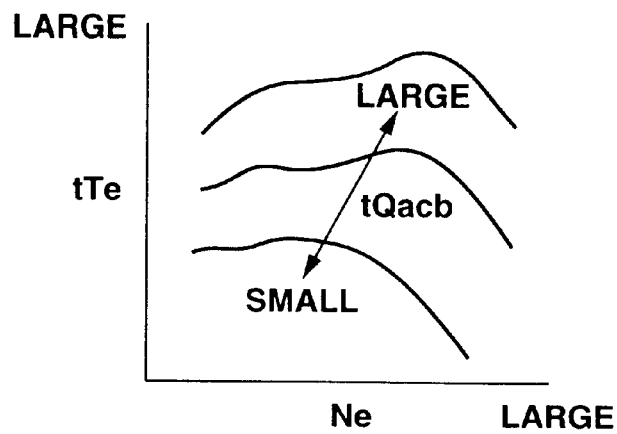
FIG. 14 is a map showing a relationship among a basic target intake air quantity, the engine speed and the target engine torque.

At step S52, ECU 20 calculates a basic target intake air quantity tQacbk by interpolation from a map shown in FIG. 14, engine speed Ne and target engine torque tTe. The map of FIG. 14 shows a relationship among EGR correction coefficient kQacegr, engine speed Ne and target engine torque tTe, and has been previously stored in the storage section of ECU 20.

At step S53, ECU 20 calculates an EGR correction coefficient kQacegr from the following equation (5).

$$kQacegr = 1/(1 + tEGR) \quad (5)$$

Figure 15:
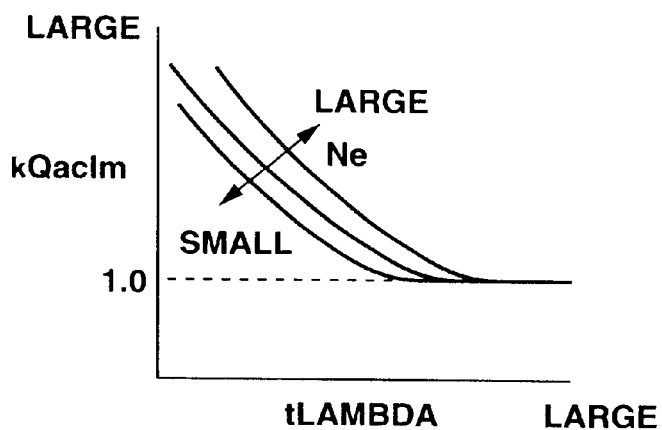
FIG. 15 is a map showing a relationship among an excess air ratio torque coefficient, the engine speed and the target excess air ratio.

At step S54, ECU 20 calculates an excess air ratio torque coefficient kQaclm by interpolation from a map shown in FIG. 15, engine speed Ne and target excess air ratio tLAMBAD. The map of FIG. 15 shows a relationship among excess air ratio torque coefficient kQaclm, engine speed Ne and target excess air ratio tLAMBAD, and has been previously stored in the storage section of ECU 20.

At step S55, ECU 20 calculates target intake air quantity tQac from the following equation (6).

$$tQac = tQacbk \times kQacegr \times kQaclm \quad (6)$$

A calculation process of target fuel injection quantity tQf will be discussed with reference to FIG. 16.

At step S61, ECU 20 reads real intake air quantity rQac and target equivalence ratio tFBYA.

At step S62, ECU 20 calculates target fuel injection quantity tQf from the following equation (7).

$$tQf = rQac \times tFBYA / BLAMB\# \quad (7)$$

where BLAMB# is a predetermined value determined by engine 8.

Figure 16:
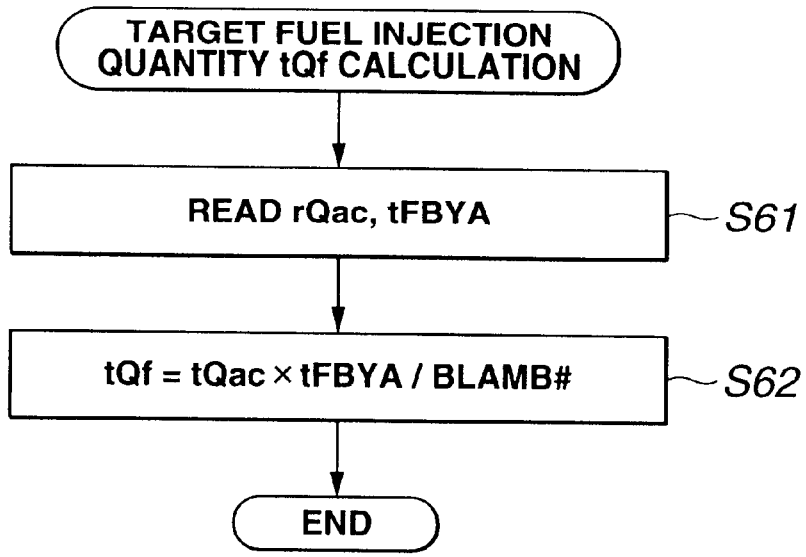
FIG. 16 is a flowchart showing a routine for calculating a target fuel injection quantity.
Figure 17:
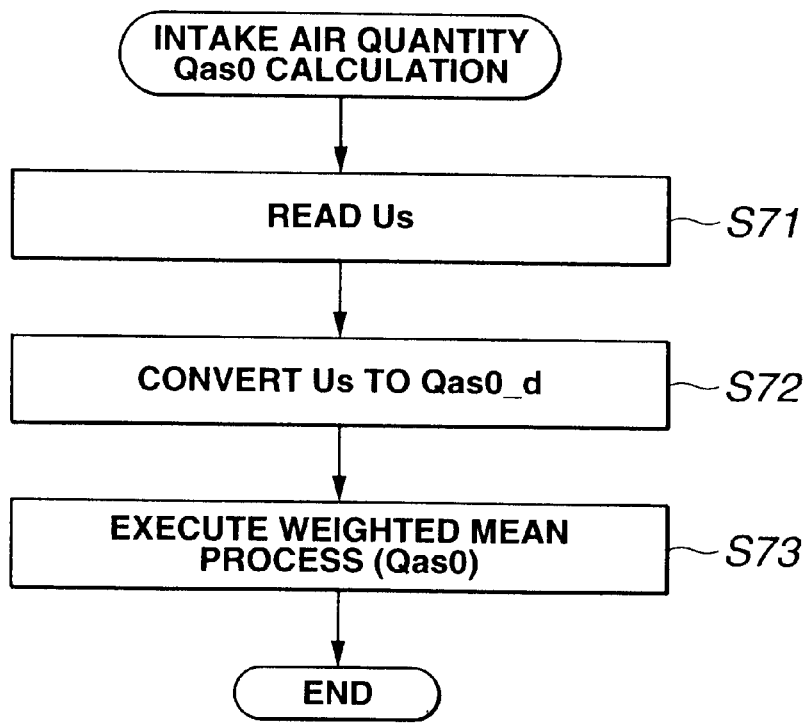
FIG. 17 is a flowchart showing a routine for calculating an intake air quantity.

Thereafter, the present routine of FIG. 16 is terminated.

ECU 20 controls the fuel injection quantity injected to engine 8 by controlling each fuel injector 9 according to target fuel injection quantity tQf determined in the above-discussed processes.

With this arrangement of the first embodiment according to the present invention, the target equivalence ratio taking account of fresh air in EGR gas is calculated on the basis of the target EGR ratio and the target excess air ratio, the target fuel injection quantity is calculated from the target equivalence ratio, and the real fuel injection quantity is adjusted to the target fuel injection ratio. Therefore, the real EGR ratio and the real excess air ratio are always adjusted at the target EGR ratio and the target excess air ratio, respectively, so that an optimum combustion condition of engine 8 is ensured. For example, even if a request for varying the target excess air ratio stepwise is generated while the target EGR ratio is kept constant, though is generally caused by executing the rich air-fuel ratio control during the regeneration of the $NO_x$ trap type catalyst 15, it is possible to maintain the optimum combustion condition while suppressing the generation of torque fluctuation and suppressing the generation of $NO_x$.

Hereinafter, there will be further discussed several flowcharts showing the calculation processes for obtaining various values employed in the above discussed control of the first embodiment.

First, calculation processes for obtaining a real intake air quantity (fresh air quantity) QasO will be discussed. A detection process for detecting an intake air quantity will be discussed with reference to a flowchart of FIG. 17.

At step S71, ECU 20 reads an output voltage Us of airflow meter 14.

Figure 18:
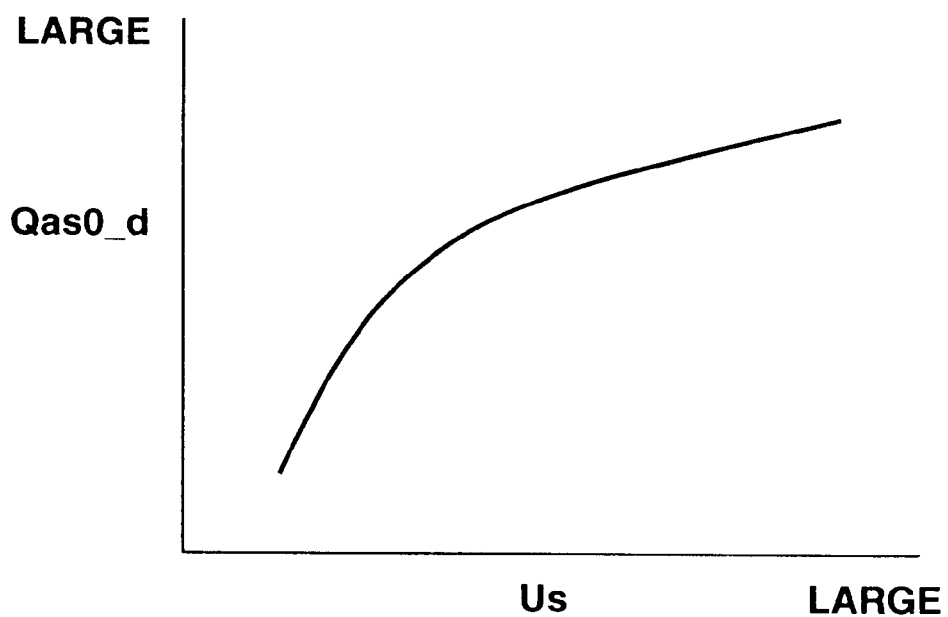
FIG. 18 is a table showing a relationship between an airflow meter output voltage and an intake air flow rate.

At step S72, ECU 20 converts output voltage Us into an intake air quantity Qas0_d from a linearizing table of FIG. 18.

At step S73, ECU 20 obtains sensed (real) intake air quantity Qas0 by executing the weighted mean process as to the intake air quantity Qas0_d obtained at step S72. Thereafter, the present routine of FIG. 16 is terminated.

A calculation process for calculating a collector intake air quantity Qacn will be discussed with reference to a flowchart of FIG. 19.

At step S81, ECU 20 reads engine speed Ne.

At step S82, ECU 20 calculates a mono-cylinder intake air quantity Qac0 from the detected intake air quantity Qas0 and the following equation (8).

$$Qac0 = Qas0 \times KCON/Ne \quad (8)$$

wherein KCON is a constant (If engine 8 is a four-cylinder engine, KCON is 30. If a six-cylinder engine, KCON is 20). The mono-cylinder intake air quantity Qac0 is an intake air quantity of each cylinder of engine 8 per unit time.

At step S83, ECU 20 obtains a collector intake air quantity Qacn by executing a delay process as to mono-cylinder intake air quantity Qac0 in order to correct a transfer delay between airflow meter 16 (intake air detecting means) and collector 5A. Then, the present routine of FIG. 19 is terminated.

A calculation process for calculating a real mono-cylinder intake air quantity rQac will be discussed with reference to FIG. 20.

Figure 19:
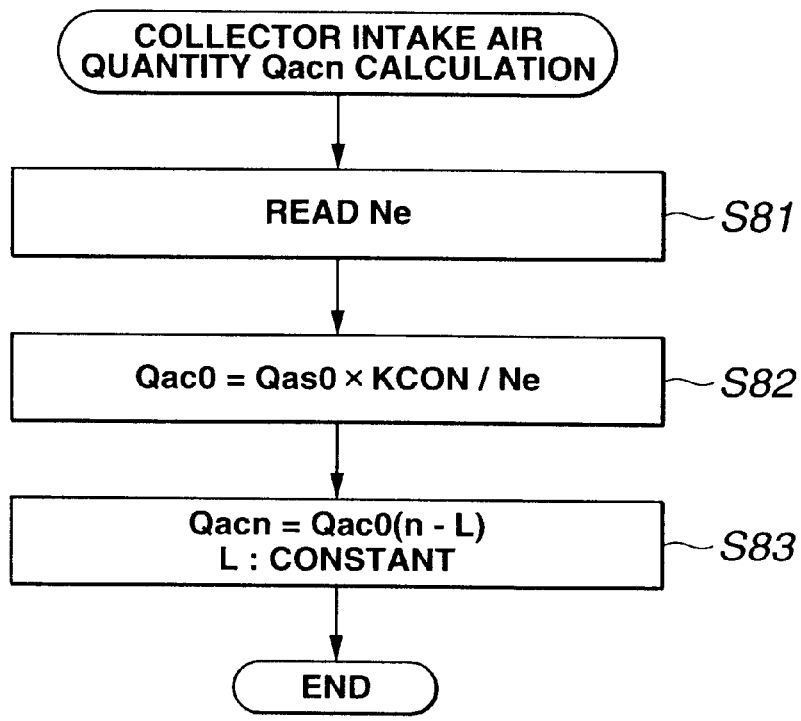
FIG. 19 is a flowchart showing a routine for calculating a collector intake air quantity.

At step S91, ECU 20 reads collector intake air quantity Qacn obtained at step S83 of FIG. 19 and a time constant corresponding value Kkin of a delay of the intake air transfer by a volume of collector 5A. Time constant corresponding value Kkin is obtained by executing a calculation process shown in FIG. 32 which will be explained later.

At step S92, ECU 20 calculates real mono-cylinder intake air quantity (mono-cylinder fresh intake air quantity) rQac by executing the weighted mean process from the following equation (9).

$$rQac = Qac \times Kkin + Qac(n-1) \times (1-Kkin) \quad (9)$$

Figure 20:
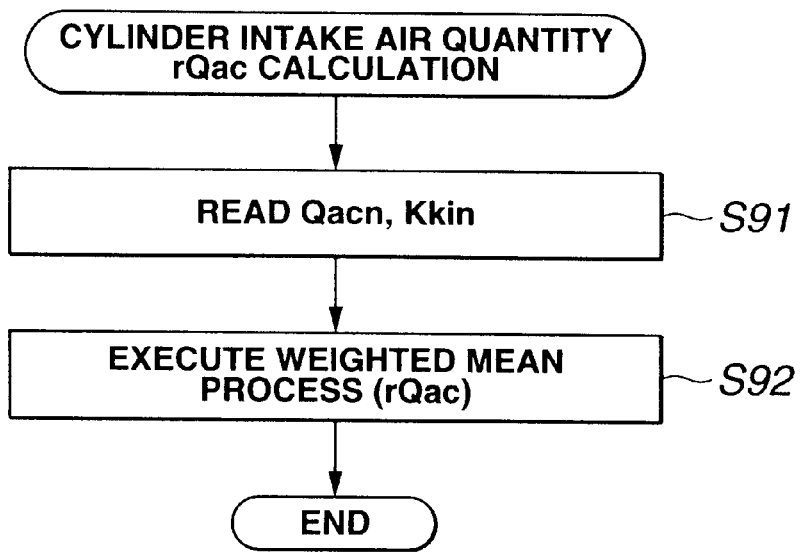
FIG. 20 is a flowchart showing a routine for calculating a cylinder intake air quantity.

Then, the present routine of FIG. 20 is terminated.

A calculation process for calculating a real EGR quantity rQec will be discussed with reference to FIG. 21.

At step S101, ECU 20 reads collector fresh intake air quantity Qacn, target EGR ratio tEGR and time constant corresponding value Kkin.

At step S102, ECU 20 calculates a collector inlet EGR quantity Qec0 from the following equation (10).

$$Qec0 = Qacn \times tEGR \quad (10)$$

At step S103, ECU 20 executes the delay process for obtaining real EGR quantity rQec by using the following equation (11) and time constant corresponding value Kkin.

$$rQec = Qec0 \times Kkin \times KE\# + Qec(n-1) \times (1-Kkin \times KE\#) \quad (11)$$

where KE# is a predetermined value determined by engine 8.

Figure 21:
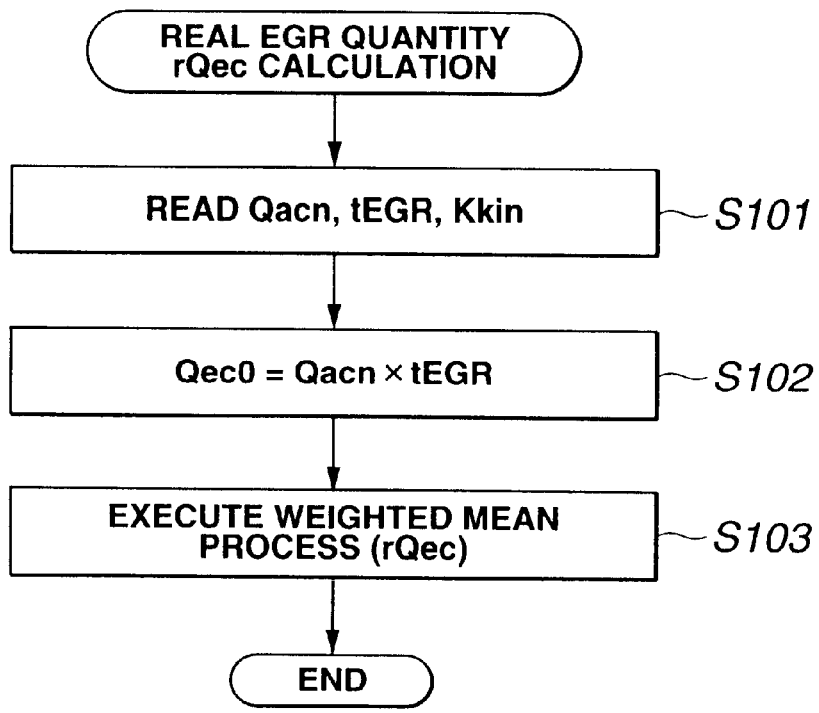
FIG. 21 is a flowchart showing a routine for calculating a real EGR quantity.

Then, the present routine of FIG. 21 is terminated.

A calculation process for calculating a real EGR ratio rEGR will be discussed with reference to FIG. 22.

At step S111, ECU 20 reads cylinder intake air quantity rQac and cylinder EGR quantity rQec.

At step S112, ECU 20 calculates real EGR ratio rEGR from the following equation (12).

$$rEGR = rQec/rQac \quad (12)$$

Figure 22:
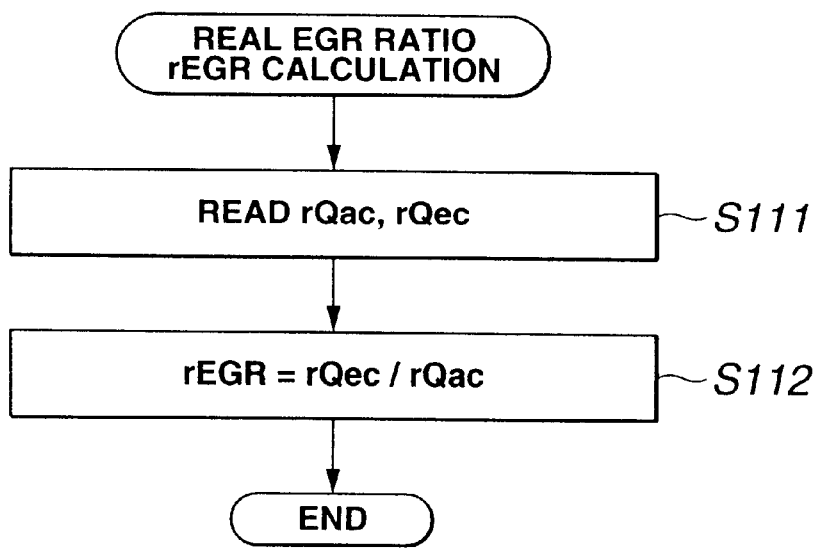
FIG. 22 is a flowchart showing a routine for calculating a real EGR ratio.

Then, the present routine of FIG. 22 is terminated.

Figure 23:
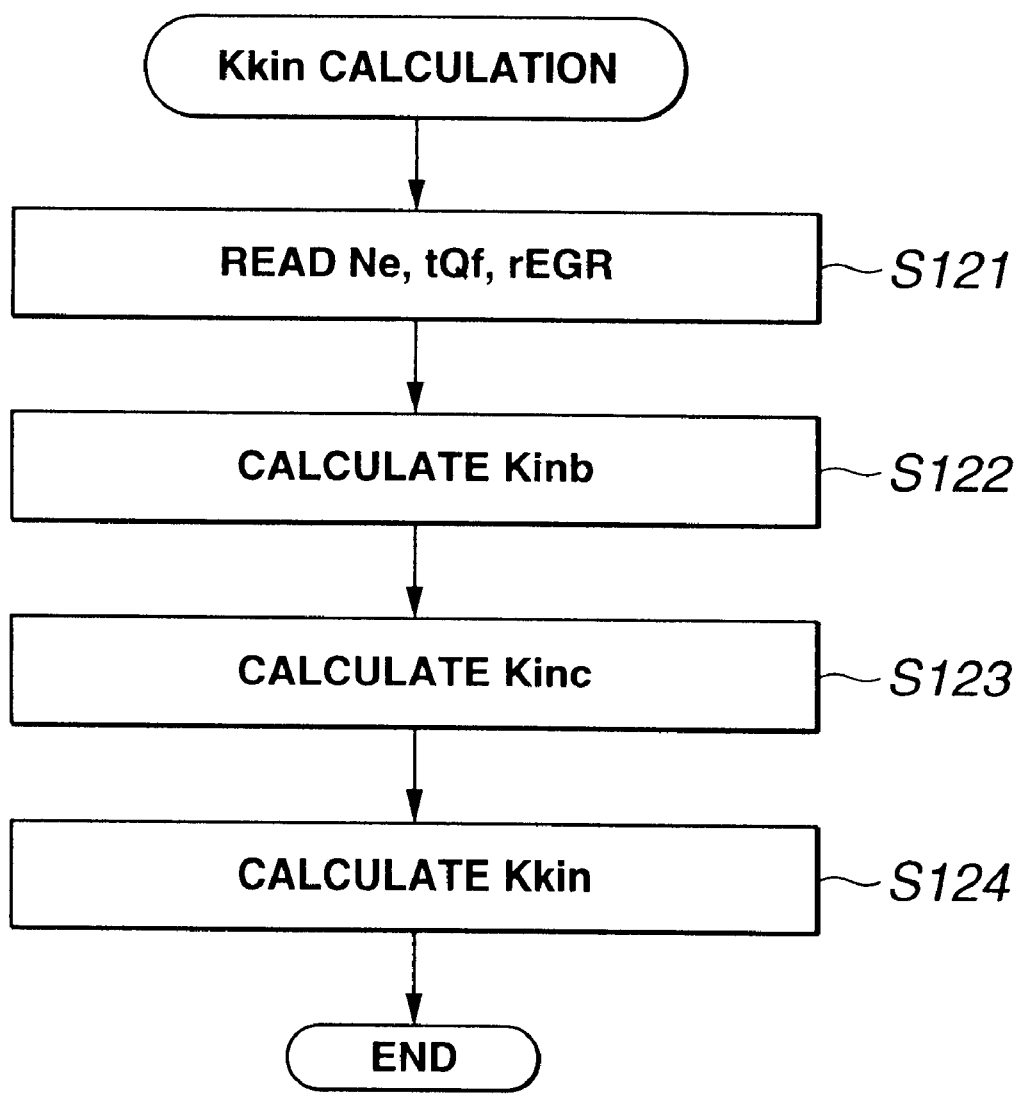
FIG. 23 is a flowchart showing a routine for calculating an intake delay time constant Kkin.

A calculation process for calculating time constant corresponding value Kkin will be discussed with reference to FIG. 23. An initial value of Kkin is set at 1.

At step S121, ECU 20 reads engine speed Ne, fuel injection quantity tQf and real EGR ratio rEGR.

Figure 24:
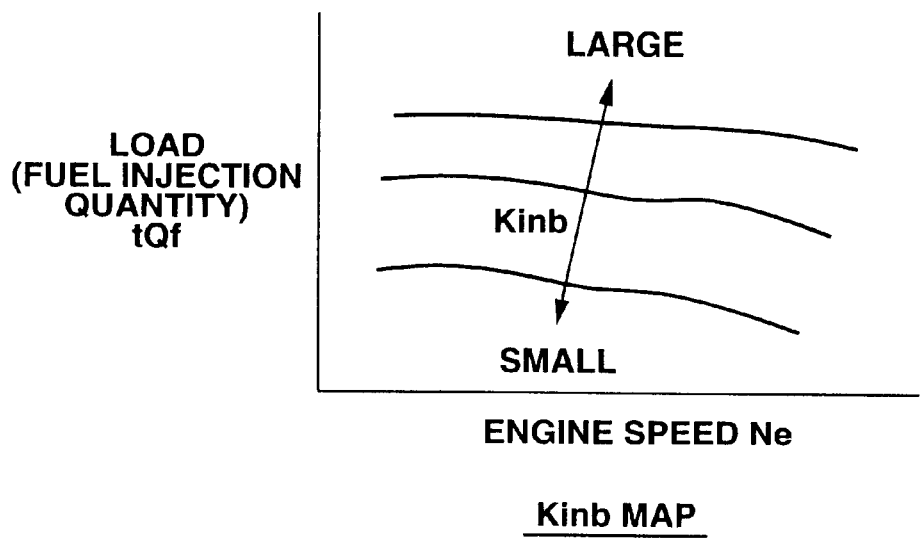
FIG. 24 is a map showing a relationship among a volume efficiency value, the engine speed and a load of the engine.

At step S122, ECU 20 calculates a volume efficiency corresponding basic value Kinb by retrieving a map of FIG. 24 from engine speed Ne and fuel injection quantity tQf. The map of FIG. 24 has been previously stored in the storage section of ECU 20.

At step S123, ECU 20 calculates a value Kinc from the following equation (13) for correcting volume efficiency corresponding basic value Kinb. This step is executed in order to correct the decrease of the volume efficiency due to the increase of the EGR ratio.

$$Kinc = Kinb/(1+rEGR/100) \quad (13)$$

At step S124, ECU 20 calculates time constant corresponding value Kkin from the following equation (14).

$$Kkin = 1/[KVOL\#/(Kinc \times Ne \times DT\#)+1] \quad (14)$$

wherein KVOL#=120×VC/VE, VC is a collector volume, VE is a displacement, and DT# is a sampling time (calculation timing).

The equation (14) has been obtained by physically estimating the intake air condition in collector 5A and the intake air condition in the cylinder.

Figure 25:
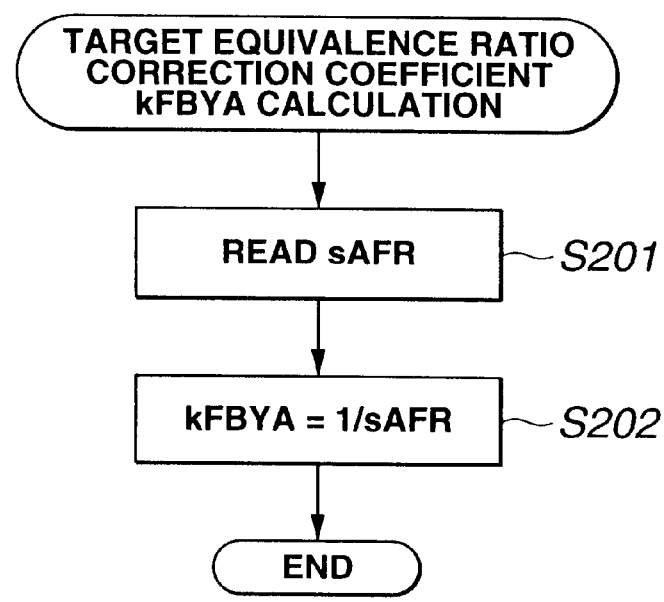
FIG. 25 is a flowchart of a calculation routine of a target equivalence ratio correction coefficient employed in a second embodiment according to the present invention.
Figure 26:
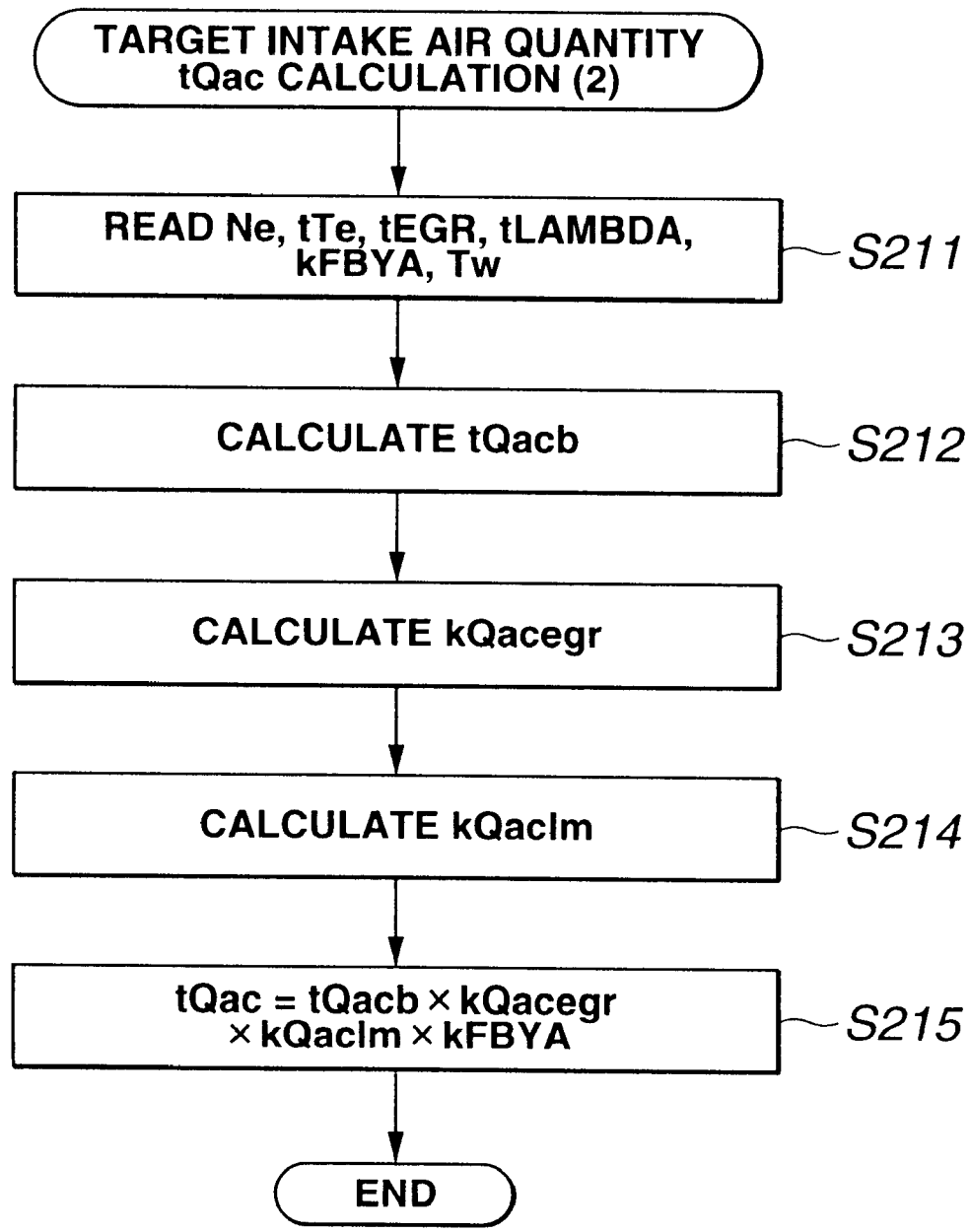
FIG. 26 is a flowchart of a routine for calculating target intake air quantity in the second embodiment.

Referring to FIGS. 25 and 26, there is shown a second embodiment of the air-fuel ratio control system according to the present invention. The second embodiment is specially arranged to detect an equivalence ratio of the exhaust gas and to execute a feedback control of target intake air quantity tQac based on the detected data.

Figure 2:
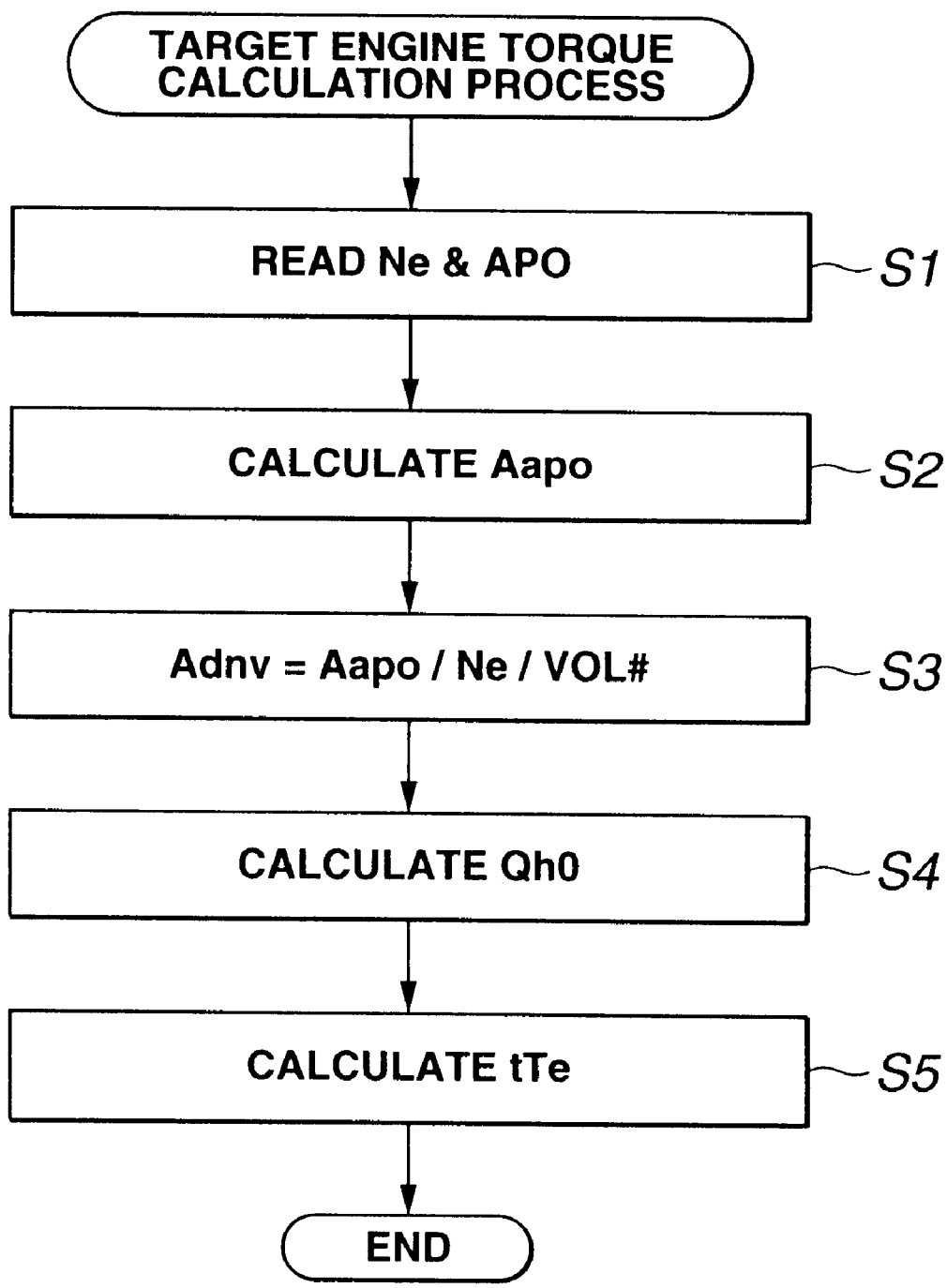
FIG. 2 is a flowchart showing a routine for calculating a target engine torque.

The construction of the second embodiment except for a part of the contents in ECU 20 is basically the same as that of the first embodiment shown in FIG. 2 except that the second embodiment further comprises an oxygen density sensor (air-fuel ratio sensor) 21. Oxygen density sensor 21 is disposed at a meeting point of exhaust manifold 10 as shown by a dot and dash line in FIG. 1, so that ECU 20 receives the oxygen density indicative information from oxygen sensor 21.

A process for setting a target equivalence ratio correction coefficient kAFR will be discussed with reference to a flowchart of FIG. 25.

At step S201, ECU 20 calculates a real equivalence ratio sAFR on the basis of a real $O_2$ density in the exhaust gas.

At step S202, ECU 20 calculates target equivalence ratio correction coefficient kFBYA from the following equation (15).

$$kAFR = 1/sAFR \quad (15)$$

Then, the present routine of FIG. 25 is terminated.

A calculation process of target intake air quantity tQac is executed with reference to the calculation result of FIG. 25.

At step S211, ECU 20 reads engine speed Ne, target engine torque tTe, target EGR ratio tEGR, target excess air ratio tLAMBDA, target equivalence ratio correction coefficient kFBYA and engine water temperature Tw.

Figure 13:
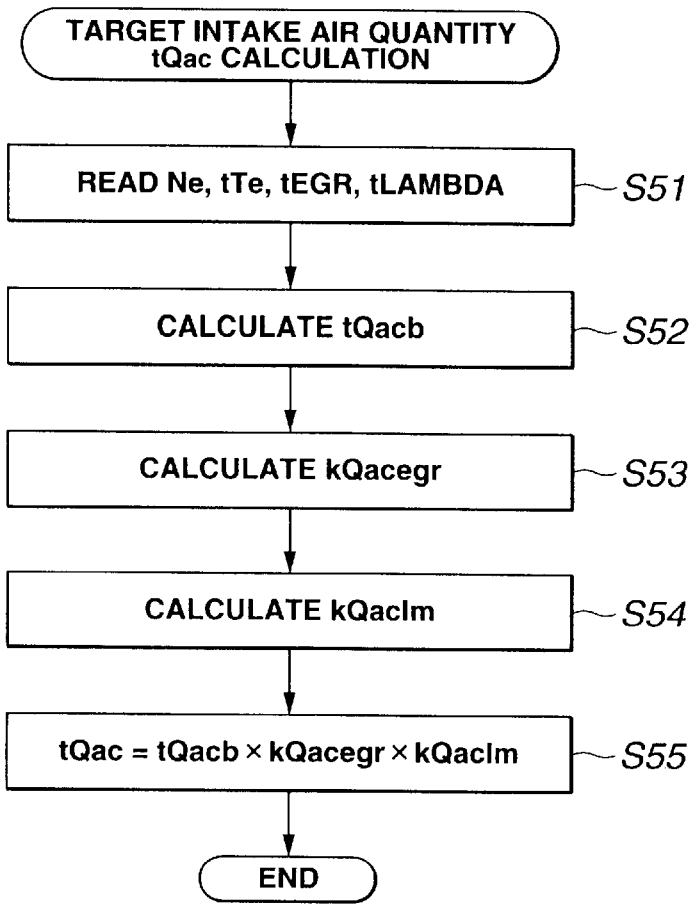
FIG. 13 is a flowchart showing a routine for calculating a target intake air quantity.

At steps S212 to S214, ECU 20 calculates basic target intake air quantity tQacb, EGR correction coefficient kQacegr and excess air ratio torque correction coefficient kQaclm, sequentially, as are similar to the processes of steps S52 to S54 of FIG. 13 discussed in the first embodiment.

At step S215, ECU 20 calculates target intake air quantity tQac from the following equation (16).

$$tQac = tQacb \times kQacegr \times kQaclm \times kFBYA \quad (16)$$

Then, the present routine of FIG. 26 is terminated.

With the thus arranged second embodiment according to the present invention, when the real equivalence ratio deviates from the target equivalence ratio, the target equivalence ratio is corrected according to the deviation of the real equivalence ratio. Therefore, the real equivalence ratio is controlled by the feedback correction so as to correspond with the desired target equivalence ratio (target equivalence ratio before correction). That is, the intake air quantity and the EGR quantity are automatically controlled so that the target combustion condition is ensured. Therefore, it becomes possible to ensure both the operational stability of engine 8 and the robustness (high stability against disturbance) of the exhaust emission control.

Figure 27:
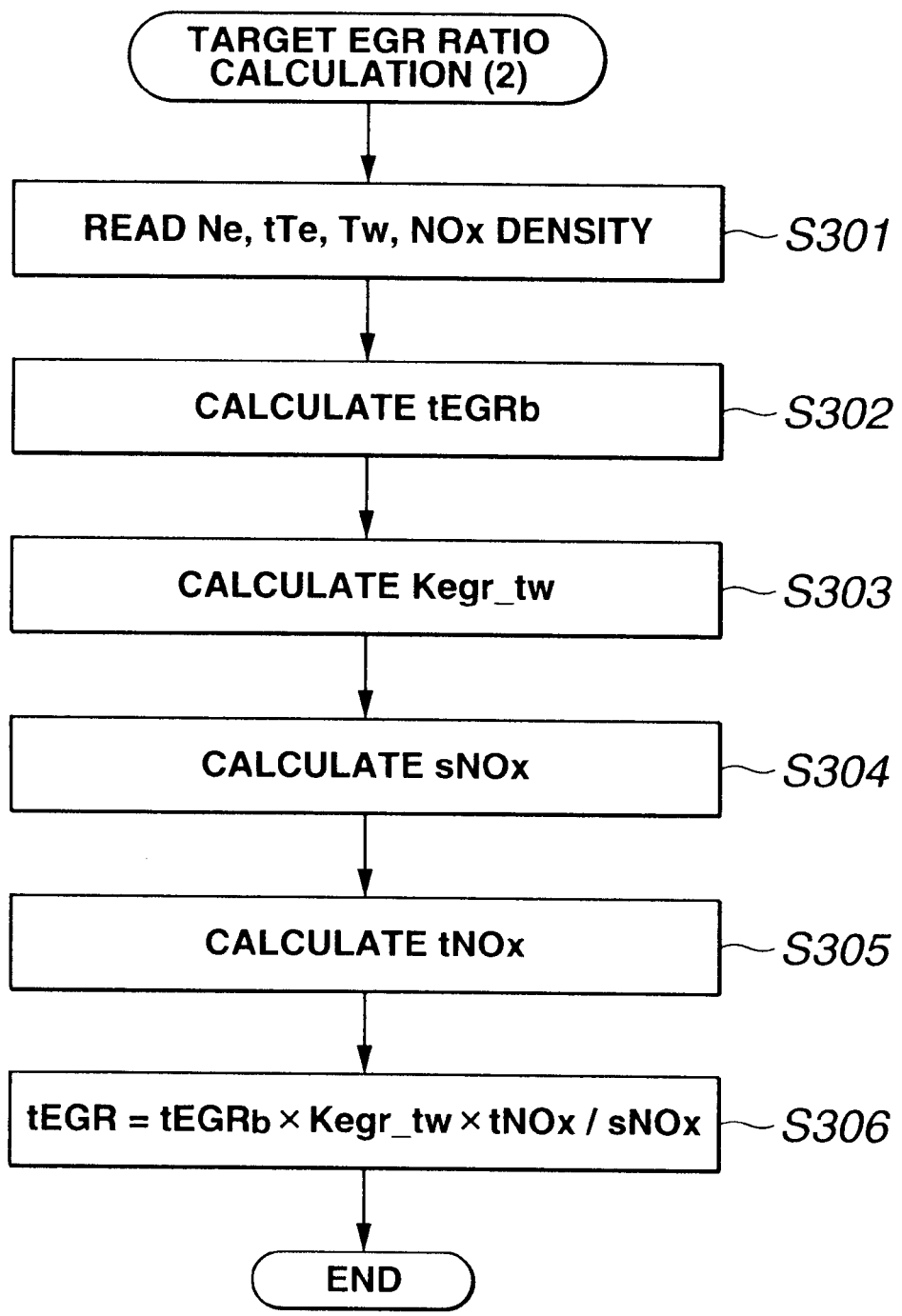
FIG. 27 is a flowchart showing a routine for calculating the target EGR ratio employed in a third embodiment according to the present invention.
Figure 28:
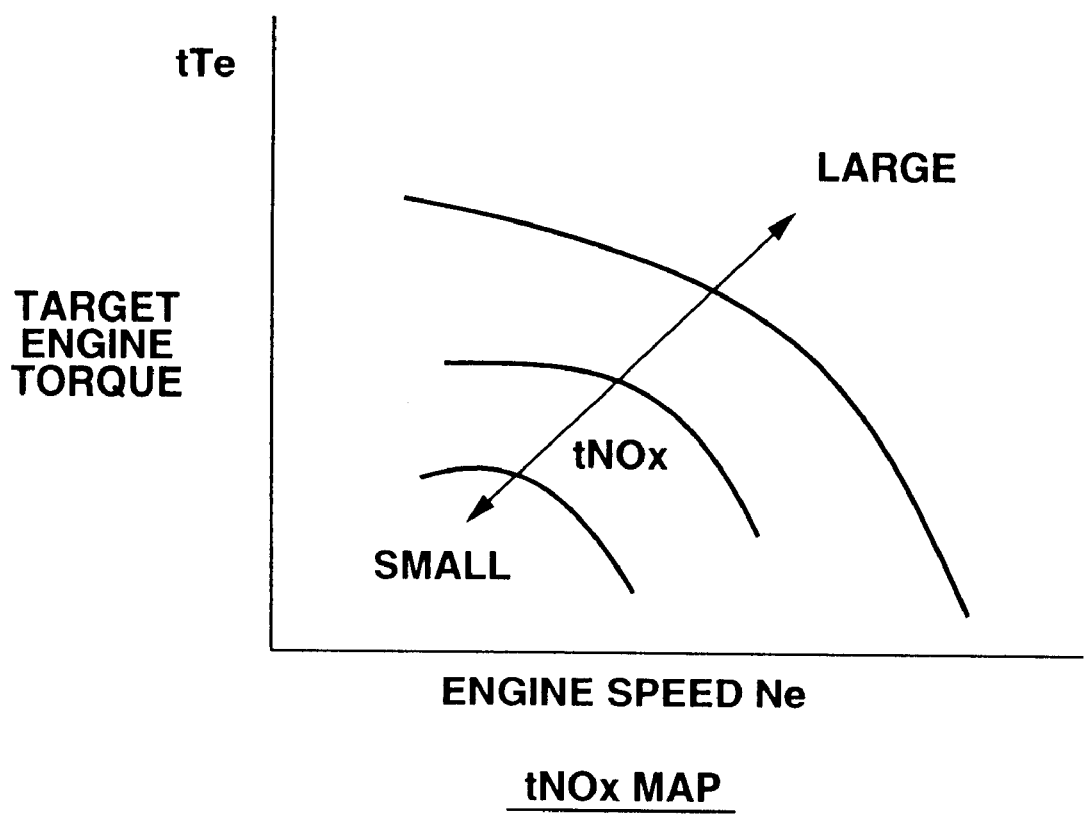
FIG. 28 is a map showing a relationship among the target EGR ratio, the engine speed and the target engine torque employed in the third embodiment.

Referring to FIGS. 27 and 28, there is shown a third embodiment of the air-fuel ratio control system according to the present invention. The third embodiment is specially arranged to calculate the target intake air quantity while varying the target EGR ratio.

The construction of the third embodiment except for a part of the contents in ECU 20 is basically the same as that of the first embodiment shown in FIG. 2 except that the third embodiment further comprises a NOx (nitrogen oxide) density sensor 31. NOx density sensor 31 is disposed at a meeting point of exhaust manifold 10 as shown by a two dots and dash line in FIG. 1, so that ECU 20 receives the $NO_x$ density indicative information from $NO_x$ density sensor 31.

A process for varying target EGR ratio tEGR according to the $NO_x$ density in the exhaust gas will be discussed with reference to a flowchart of FIG. 27.

At step S301, ECU 20 reads engine speed Ne, target engine torque tTe, engine water temperature Tw and $NO_x$ density.

Figure 6:
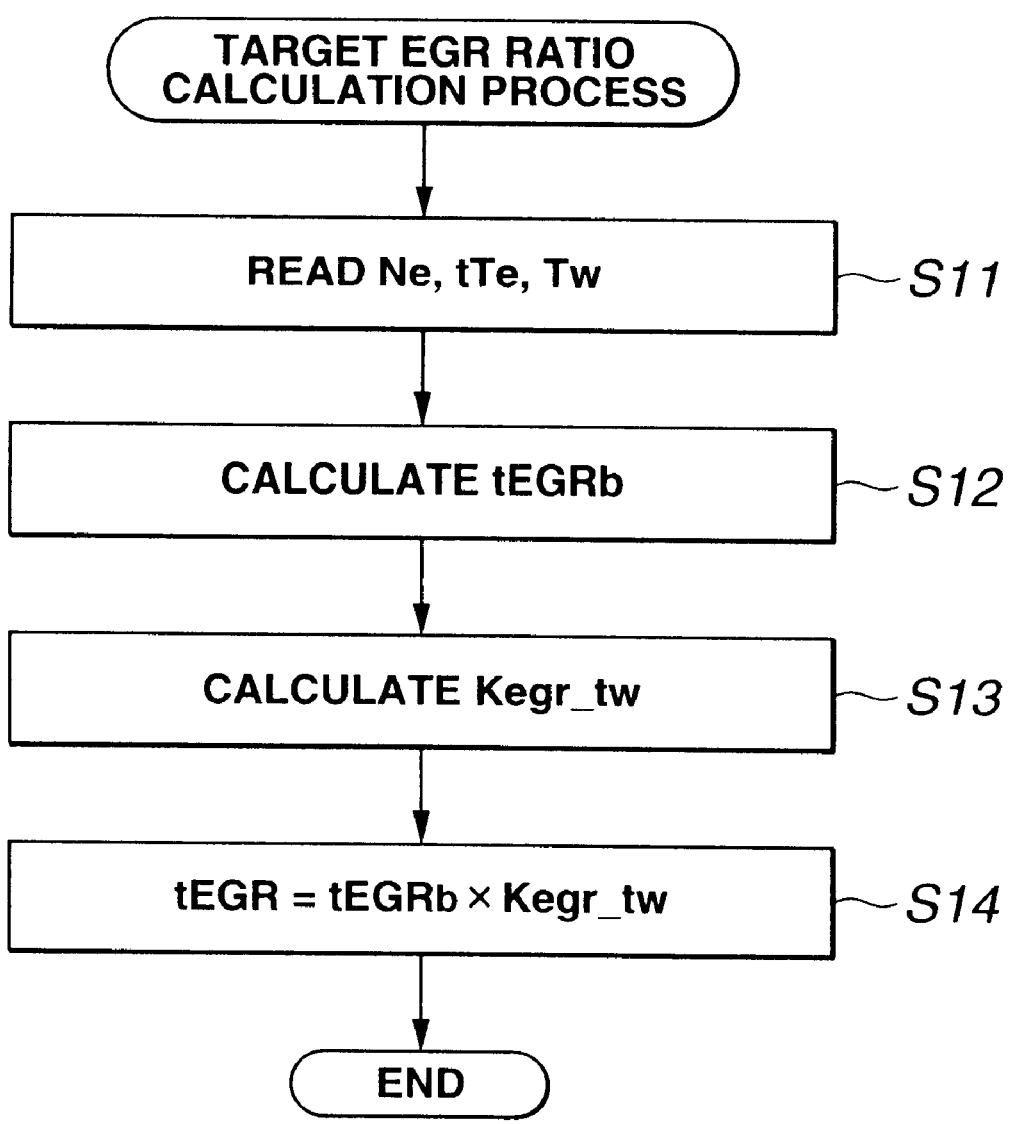
FIG. 6 is a flowchart showing a routine for calculating a target EGR ratio.

At steps S302 and S303, ECU 20 calculates basic target EGR ratio tEGRb and target EGR-ratio temperature correction-coefficient Kegr_tw, sequentially, as are similar to the processes of steps S12 and S13 of FIG. 6 in the first embodiment.

At step S304, ECU 20 converts the detected NOx density into the equivalence ratio sNOx.

At step S305, ECU 20 calculates target $No_x$ density $tNO_x$ (equivalence ratio) by interpolation from engine speed Ne, target engine torque tTe and a map of FIG. 28 which shows a relationship among target $NO_x$ density, engine speed Ne and target engine torque tTe. This map of FIG. 28 has been previously stored in the storage section of ECU 20.

At step S306, ECU 20 calculates target EGR ratio tEGR from the following equation (17), basic target EGR ratio tEGRb, target EGR-ratio temperature correction-coefficient Kegr_tw, target $NO_x$ density $tNO_x$ and equivalence ratio $sNO_x$.

$$tEGR = tEGRb \times Kegr\_tw \times tNO_x/sNO_x \quad (17)$$

Then, the present routine of FIG. 27 is terminated.

With the thus arranged third embodiment according to the present invention, when the real EGR ratio deviates from target EGR ratio, target EGR ratio is corrected according to the deviation of the real EGR ratio. Therefore, the real EGR is controlled by the feedback correction so as to correspond with the desired target EGR ratio (target EGR ratio before correction). That is, by correcting target EGR ratio so that the $NO_x$ density is normally kept at a suitable value, the intake air quantity and the EGR quantity are automatically controlled so that the target combustion condition is ensured. Therefore, it becomes possible to suppress the increase of $NO_x$ due to the circumstantial deviation while ensuring a suitable operational performance.

Figure 29:
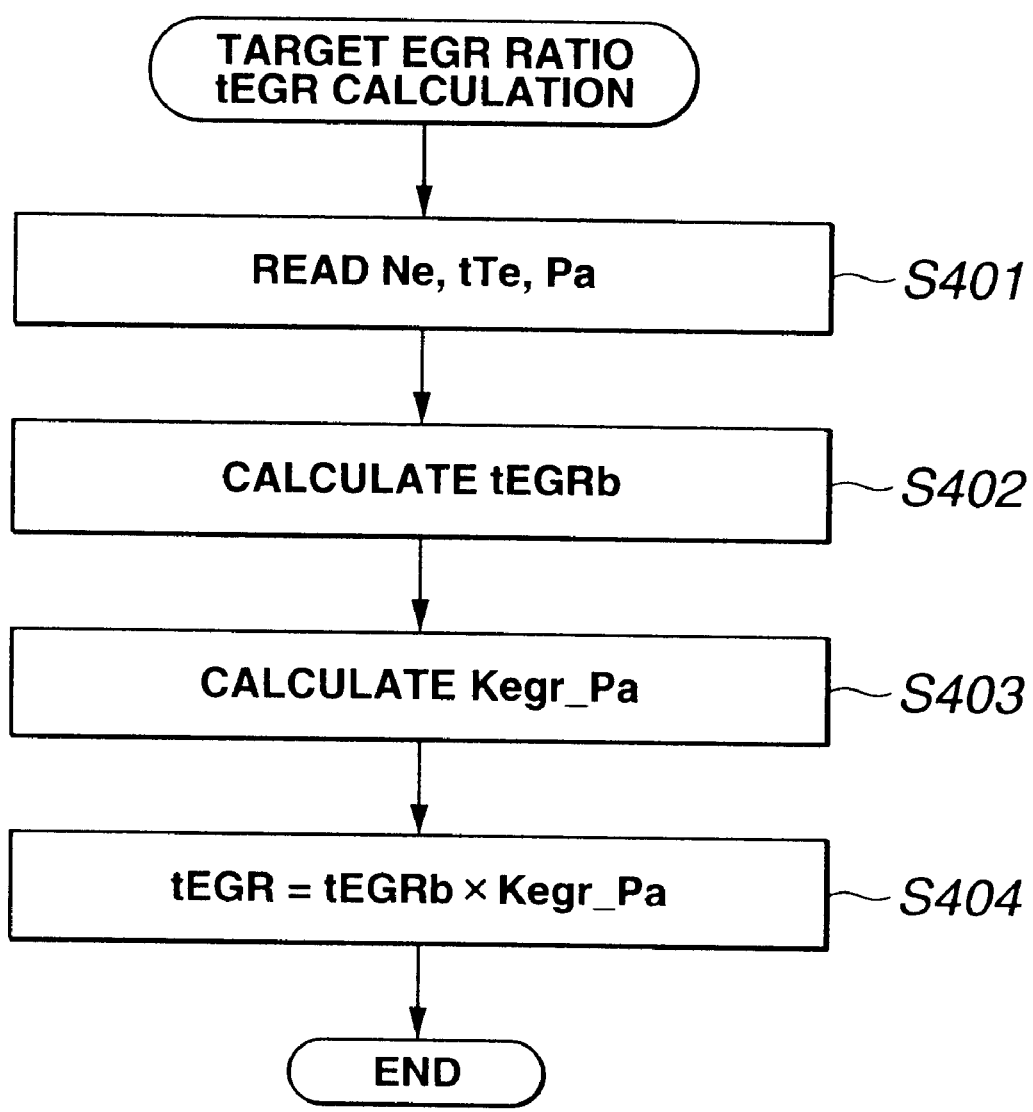
FIG. 29 is a flowchart showing a routine for calculating the target EGR ratio employed in a fourth embodiment according to the present invention.
Figure 30:
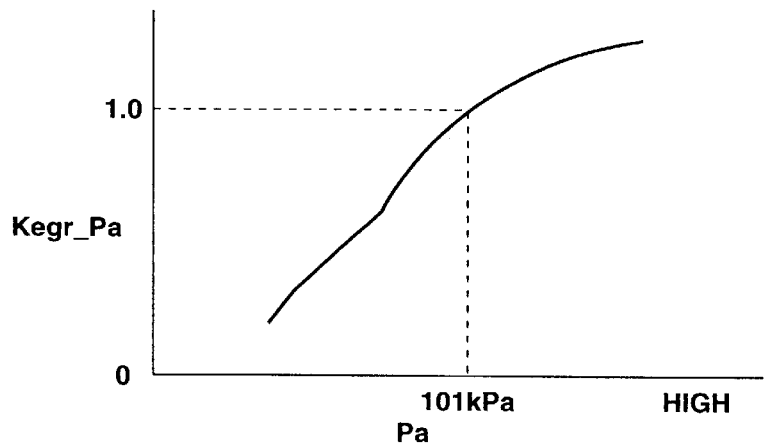
FIG. 30 is a table showing a relationship between a target EGR ratio correction coefficient and an atmospheric pressure.

Referring to FIGS. 29 and 30, there is shown a fourth embodiment of the air-fuel ratio control system according to the present invention. The fourth embodiment is specially arranged to correct target EGR ratio tEGR according to the atmospheric pressure.

The construction of the fourth embodiment except for a part of the contents in ECU 20 is basically the same as that of the first embodiment shown in FIG. 2 except that the fourth embodiment further comprises an atmospheric pressure sensor 41 for detecting the atmospheric pressure. Atmospheric pressure sensor 41 is coupled to ECU 20 as shown by a dotted line in FIG. 1 and sends atmospheric pressure indicative information to ECU 20.

A calculation process of target EGR ratio tEGR will be discussed with reference to a flowchart of FIG. 29.

At step S401, ECU 20 reads engine speed Ne, target engine torque tTe and atmospheric pressure Pa detected by atmospheric pressure sensor 41.

At step S402, ECU 20 calculates basic target EGR ratio tEGRb as is similar to the process of step S12 of FIG. 6 in the first embodiment.

At step S403, ECU 20 calculates target EGR-ratio atmospheric-pressure correction-coefficient Kegr_Pa by retrieving a table shown in FIG. 30 on the basis of atmospheric pressure Pa. The table of FIG. 30 shows a relationship between target EGR-ratio atmospheric-pressure correction-coefficient Kegr_Pa and atmospheric pressure Pa, and has been previously stored in the storage section of ECU 20. As is clear from the table of FIG. 30, the target EGR ratio is controlled so as to decrease according to the decrease of the atmospheric pressure, in order to prevent the combustion of engine 8 from degrading under the low-atmospheric pressure condition such as on upland where the quantity of fresh intake air is reduced and the real compression ratio is lowered.

At step S404, ECU 20 calculates target EGR ratio tEGR on the basis of target EGR ratio tEGRb and target EGR-ratio atmospheric-pressure correction-coefficient Kegr_Pa from the following equation (18).

$$tEGR = tEGRb \times Kegr\_Pa \quad (18)$$

With this arrangement of the fourth embodiment according to the present invention, the combustion condition of engine 8 is kept good even when engine 8 works under the low-atmospheric pressure condition.

Figure 31:
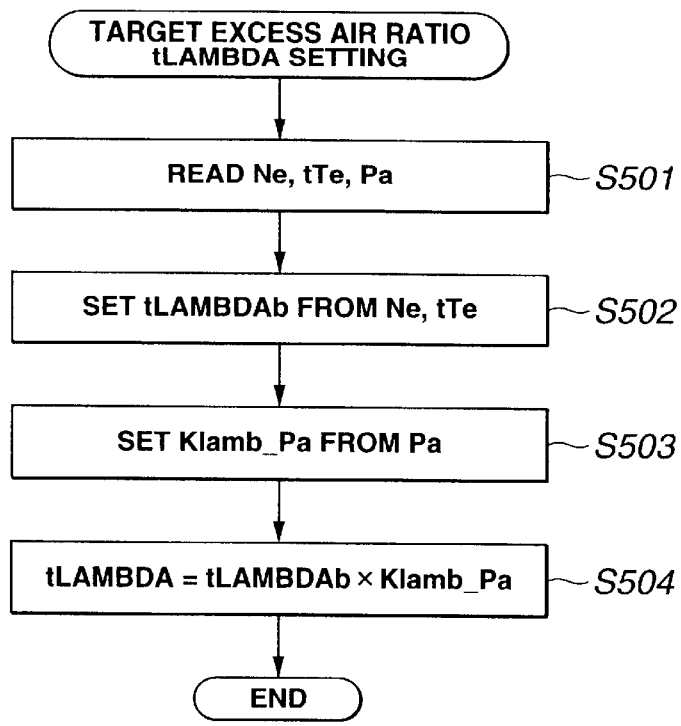
FIG. 31 is a flowchart showing a routine for calculating the target EGR ratio employing in a fifth embodiment according to the present invention.
Figure 32:
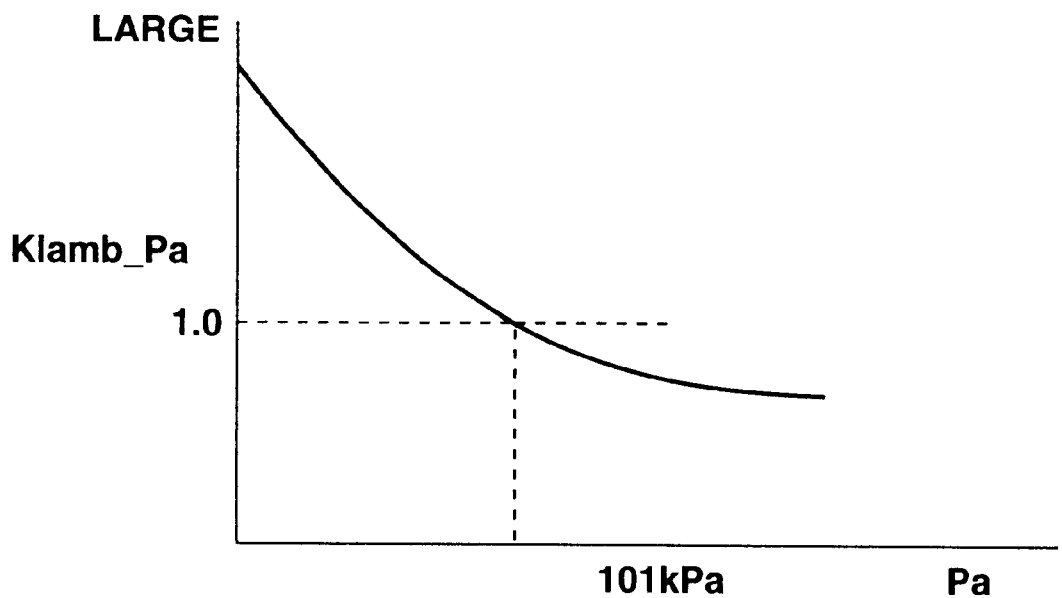
FIG. 32 is a map showing a relationship between a target excess air ratio correction coefficient and the atmospheric pressure.

Referring to FIGS. 31 and 32, there is shown a fifth embodiment of the air-fuel ratio control system according to the present invention. The fifth embodiment is specially arranged to correct target excess air ratio tLAMBDA according to the atmospheric pressure.

The construction of the fifth embodiment except for a part of the contents in ECU 20 is basically the same as that of the first embodiment shown in FIG. 2 except that the fifth embodiment further comprises the atmospheric pressure sensor 41 for detecting the atmospheric pressure, as is similar to the fourth embodiment. Atmospheric pressure sensor 41 is coupled to ECU 20 as shown by a dotted line in FIG. 1 and sends atmospheric pressure indicative information to ECU 20.

A calculation process of target excess air ratio tLAMBDA will be discussed with reference to a flowchart of FIG. 31.

At step S501, ECU 20 reads engine speed Ne, target engine torque tTe and atmospheric pressure Pa detected by atmospheric pressure sensor 41.

Figure 9:
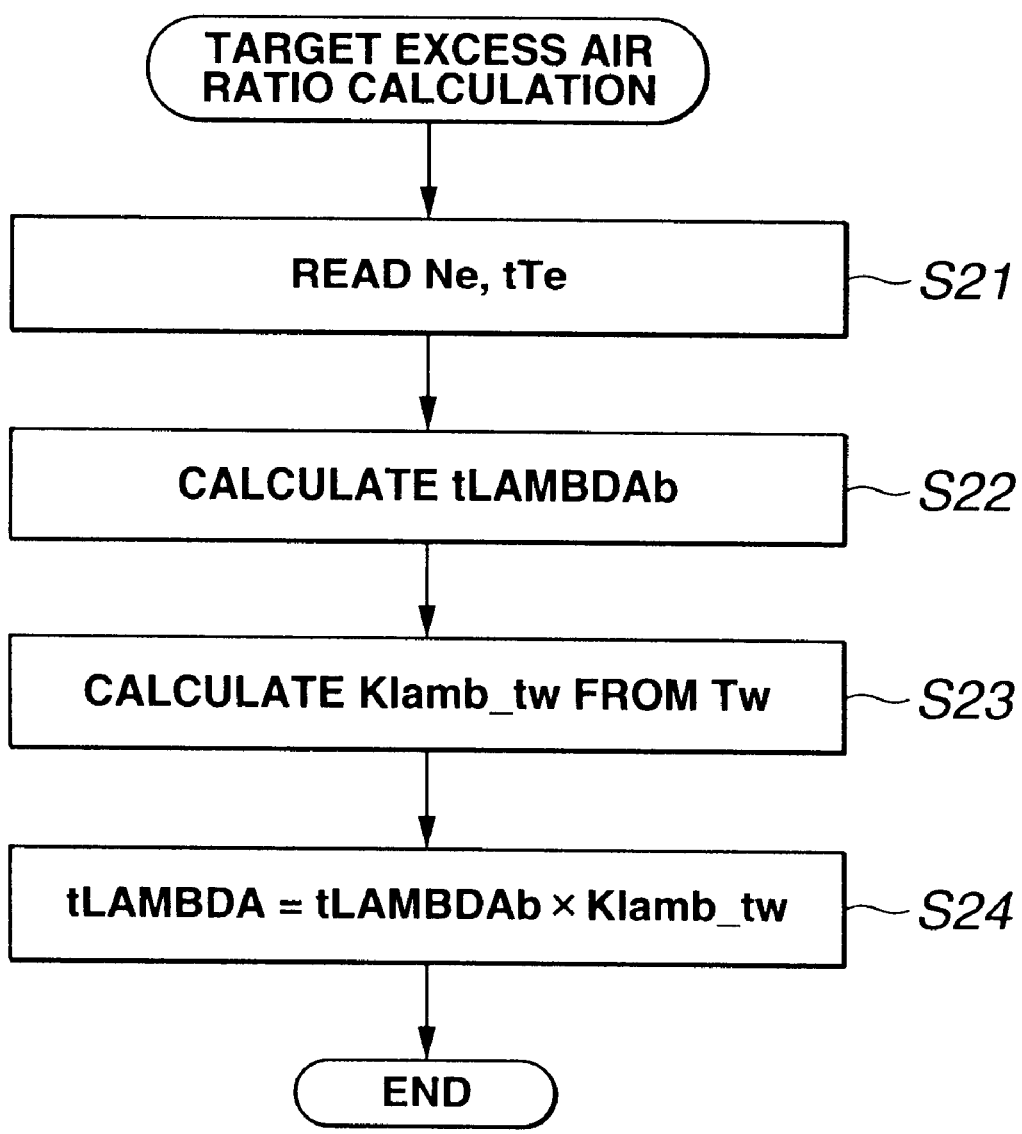
FIG. 9 is a flowchart showing a routine for calculating a target excess air ratio.

At step S502, ECU 20 calculates (sets) basic target excess air ratio tLAMBDAb from engine speed Ne, target engine torque tTe and the map shown in FIG. 10, as is similar to the process of step S22 of FIG. 9.

At step S503, ECU 20 calculates target excess air ratio atmospheric-pressure correction-coefficient Klmb_Pa by retrieving a table shown in FIG. 32 on the basis of atmospheric pressure Pa. The table of FIG. 32 shows a relationship between target excess air ratio atmospheric-pressure correction-coefficient Klmb_Pa and atmospheric pressure Pa, and has been previously stored in the storage section of ECU 20. As is clear from the table of FIG. 32, the target excess air ratio is controlled so as to increase as the atmospheric pressure decreases. This correction is executed in order to ensure the mass airflow quantity by increasing the throttle opening or the charging pressure of turbocharger 1 so that the target intake air quantity is increased under the low-atmospheric pressure condition such as on upland.

At step S504, ECU 20 calculates target excess air ratio tLAMBDA by multiplying basic target excess air ratio tLAMBAD by target excess air ratio atmospheric-pressure correction-coefficient Klmb_Pa as represented by the following equation (19).

$$tLAMBDA = tLAMBDAb \times Klamb\_Pa \quad (19)$$

Then, the present routine of FIG. 31 is terminated.

With this arrangement of the fifth embodiment according to the present invention, the degradation of the combustion in engine 8 is kept good even when engine 8 works under the low-atmospheric pressure condition and does not execute the feedback control of the air mass quantity.

Further, with the thus arranged first to fifth embodiments according to the present invention, the target EGR ratio is corrected on the basis of the engine circumstantial temperature condition including engine oil, water temperatures, intake air temperature, atmospheric pressure condition, external circumstantial condition. Therefore, it becomes possible to suitably maintain the exhaust gas purifying performance even during an engine warming up condition in which the exhaust gas purifying performance tends to be degraded by an operation for stabilizing the combustion.

Furthermore, it is possible to maintain the optimum combustion condition of engine so as to ensure the preferable operational performance even under a condition that oxygen density decreased condition such as an operation on an upland.

Furthermore, with these arrangements according to the present invention, even when the engine temperature is low, it is possible to increase the intake air quantity so as to suppress the increase of the friction and to stabilize the operation of the engine. Additionally, even when the intake air quantity is decreased by the upland traveling, it is possible to maintain the combustion condition at an optimum state. Further, since the target intake air quantity is corrected according to the target EGR ratio and the target excess air ratio, it is possible to preferably set the target intake air quantity so as to adapt to the change of the target EGR ratio and the target excess air ratio. Therefore, it is possible to preferably control the intake air quantity even during transition. Furthermore, since the intake air quantity is automatically varied by varying the target EGR ratio and/or the target excess air ratio, it is easy to adapt the engine operating condition at a desired condition.

Furthermore, with these arrangements according to the present invention, the nonlinearity of the engine torque relative to the excess air ratio is reflected in the target intake air quantity. Therefore, it is possible to maintain the output torque of engine 8 at the target value while keeping the target excess air ratio even when the rich air-fuel ratio control is executed during the regeneration of the $NO_x$ trap type catalyst (during the $NO_x$ reduction process).

Since the EGR ratio in the operation gas actually fed into cylinders is predicted and is employed the predicted EGR ratio in the calculation of the target equivalence ratio, it is possible to compensate an error due to the intake delay of the EGR gas during transition. This enables the accurate execution of the EGR control. Further, since the oxygen density in the exhaust gas (real equivalence ratio) is detected and is employed in the correction of the target intake air quantity, the intake air quantity and the EGR ratio are automatically corrected so as to ensure the target combustion condition while maintaining the engine torque at the target engine torque. Therefore, it is possible to ensure the robustness (high stability to disturbance) of the exhaust gas purifying performance while maintaining the suitable operational performance of the engine.

This application is based on a prior Japanese Patent Application No. 2001-26035 filed on Feb. 1, 2001 in Japan. The entire contents of this Japanese Patent Application are hereby incorporated by reference.

Although the invention has been described above by reference to certain embodiments of the invention, the invention is not limited to the embodiments described above. Modifications and variations of the embodiment described above will occur to those skilled in the art, in light of the above teaching. The scope of the invention is defined with reference to the following claims.

What is claimed is:

1. An air-fuel ratio control system for an internal combustion engine, comprising:
   an engine condition detecting unit detecting an engine operating condition of the internal combustion engine; and
   a control unit coupled to the engine condition detecting unit, the control unit being arranged,
     to calculate a target engine torque on the basis of the engine operating condition,
     to calculate a target EGR ratio, a target excess air ratio and a target intake air quantity on the basis of the engine operating condition and the target engine torque,
     to calculate a target equivalence ratio on the basis of the target EGR ratio and the target excess air ratio,
     to calculate a target injection quantity on the basis of the engine operating condition and the target equivalence ratio,
     to control an air-fuel ratio at a desired value by bringing a real intake air quantity to the target intake air quantity and by bringing a real fuel injection quantity to the target fuel injection quantity.

2. The air-fuel ratio control system as claimed in claim 1, wherein the control unit corrects the target EGR ratio on the basis of at least one of an engine temperature condition and an atmospheric condition.

3. The air-fuel ratio control system as claimed in claim 1, wherein the control unit corrects the target excess air ratio on the basis of at least one of an engine temperature condition and an atmospheric condition.

4. The air-fuel ratio control system as claimed in claim 1, wherein the control unit corrects the target intake air quantity on the basis of at least one of the target EGR ratio and the target excess air ratio.

5. The air-fuel ratio control system as claimed in claim 1, wherein the control unit corrects the intake air quantity on the basis of the non-linearity of an engine torque relative to excess air ratio.

6. The air-fuel ratio control system as claimed in claim 1, wherein the control unit calculates the target equivalence ratio from a value obtained by processing the target EGR ratio by means of a delay process of the real EGR.

7. The air-fuel ratio control system as claimed in claim 1, wherein the control unit corrects the target intake air quantity on the basis of an oxygen density in exhaust gas of the engine.

8. The air-fuel ratio control system as claimed in claim 1, wherein the control unit corrects the target EGR ratio on the basis of a nitrogen oxide ($NO_x$) density in exhaust gas of the engine.

9. The air-fuel ratio control system as claimed in claim 1, further comprising a nitrogen oxide ($NO_x$) trap catalyst which stores $NO_x$ in exhaust gas of the engine, the control unit executes a regeneration process for deoxidizing the $NO_x$ stored in the $NO_x$ trap catalyst into HC by means of a rich air-fuel ratio control.

10. The system as claimed in claim 1, wherein the engine condition detecting unit comprises at least one of an airflow meter for detecting an intake air quantity, an engine water temperature sensor for detecting an engine water temperature, an engine speed sensor and an accelerator opening sensor for detecting an opening of accelerator.

11. An air-fuel ratio control system for an internal combustion engine, comprising:

an engine condition detecting unit detecting an engine operating condition of the internal combustion engine;

a throttle valve varying a real intake air quantity of air to be supplied to the internal combustion engine;

a fuel injector injecting a real fuel injection quantity of fuel into each combustion chamber of the internal combustion engine; and a control unit coupled to the engine condition detecting unit, the throttle valve and the fuel injector, the control unit being arranged, to calculate a target engine torque on the basis of the engine operating condition;

to calculate a target EGR ratio, a target excess air ratio and a target intake air quantity on the basis of the engine operating condition and the target engine torque, to calculate a target equivalence ratio on the basis of the target EGR ratio and the target excess air ratio, to calculate a target injection quantity on the basis of the engine operating condition and the target equivalence ratio, to control the throttle valve and the fuel injector so as to bring the real intake air quantity to the target intake air quantity and to bring the real fuel injection quantity to the target fuel injection quantity.

12. An air-fuel ratio control system for an internal combustion engine, comprising:

engine operating condition detecting means for detecting an engine operating condition of the internal combustion engine;

first calculating means for calculating a target engine torque on the basis of the engine operating condition;

second calculating means for calculating a target EGR ratio, a target excess air ratio and a target intake air quantity on the basis of the engine operating condition and the target engine torque;

third calculating means for calculating a target equivalence ratio on the basis of the target EGR ratio and the target excess air ratio;

fourth calculating means for calculating a target injection quantity on the basis of the engine operating condition and the target equivalence ratio; and controlling means for controlling an air-fuel ratio at a desired value by bringing a real intake air quantity to the target intake air quantity and by bringing a real fuel injection quantity to the target fuel injection quantity.

13. A method for controlling an air-fuel ratio of an internal combustion engine, comprising:

detecting an engine operating condition of the internal combustion engine;

calculating a target engine torque on the basis of the engine operating condition;

calculating a target EGR ratio, a target excess air ratio and a target intake air quantity on the basis of the engine operating condition and the target engine torque;

calculating a target equivalence ratio on the basis of the target EGR ratio and the target excess air ratio;

calculating a target injection quantity on the basis of the engine operating condition and the target equivalence ratio; and controlling an air-fuel ratio at a desired value by bringing a real intake air quantity to the target intake air quantity and by bringing a real fuel injection quantity to the target fuel injection quantity.

* * * * *